United States Patent
Lesko

(10) Patent No.: US 8,479,816 B2
(45) Date of Patent: Jul. 9, 2013

(54) METHOD OF IMPROVING THE CONDUCTIVITY OF A FRACTURE IN THE SPACE BETWEEN PROPPANT PILLARS

(75) Inventor: Timothy Michael Lesko, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/600,985

(22) PCT Filed: May 22, 2007

(86) PCT No.: PCT/RU2007/000252
§ 371 (c)(1),
(2), (4) Date: Aug. 4, 2010

(87) PCT Pub. No.: WO2008/143544
PCT Pub. Date: Nov. 27, 2008

(65) Prior Publication Data
US 2010/0294500 A1    Nov. 25, 2010

(51) Int. Cl.
*E21B 43/267* (2006.01)
(52) U.S. Cl.
USPC ...... 166/280.1; 166/279; 166/300; 166/308.1
(58) Field of Classification Search
None
See application file for complete search history.

(56) References Cited

U.S. PATENT DOCUMENTS

| 4,785,884 | A | 11/1988 | Armbruster |
| 6,114,410 | A | 9/2000 | Betzold |
| 6,328,105 | B1 | 12/2001 | Betzold |
| 6,632,527 | B1 | 10/2003 | McDaniel et al. |
| 7,581,590 | B2 | 9/2009 | Lesko et al. |
| 2004/0094300 | A1 | 5/2004 | Sullivan et al. |
| 2004/0261995 | A1 | 12/2004 | Nguyen et al. |
| 2005/0019574 | A1 | 1/2005 | McCrary |
| 2005/0059558 | A1 | 3/2005 | Blauch et al. |
| 2005/0130848 | A1 | 6/2005 | Todd et al. |
| 2005/0274523 | A1 | 12/2005 | Brannon et al. |
| 2006/0048943 | A1 | 3/2006 | Parker et al. |
| 2006/0058197 | A1 | 3/2006 | Brown et al. |
| 2006/0073980 | A1 | 4/2006 | Brannon et al. |

FOREIGN PATENT DOCUMENTS

| WO | WO2006032833 | 3/2006 |
| WO | 2007/086771 | 8/2007 |

OTHER PUBLICATIONS

Office action for the equivalent Mexican patent application No. MX/a/2009/012454 issued on Aug. 7, 2012.

*Primary Examiner* — Zakiya W Bates
(74) *Attorney, Agent, or Firm* — Daryl Wright; Jeremy Tillman; Robin Nava

(57) ABSTRACT

The application is directed to a hydraulic fracturing method and can be used for enhancement of the well production. The method for enhancement of fracture conductivity comprises the chemical treatment of the fracture surface and the space between the proppant pillars over the protective mask formed by material precipitated out from the proppant pillar.

20 Claims, No Drawings

METHOD OF IMPROVING THE CONDUCTIVITY OF A FRACTURE IN THE SPACE BETWEEN PROPPANT PILLARS

The invention relates to the area of oil-and-gas production, based on the use of a hydraulic fracturing method, and can be used for enhancement of the production of a well due to improvement in the oil conductivity between pillars formed by proppant particles inside a hydraulic fracture, preferably after the fracture has been formed as a result of hydraulic fracturing and fixed in open state by using proppant pillars.

It should be noted that all embodiments of the method developed are aimed at improving the fluid flow in the area around the pillars. Usually, such pillars are produced as a result of inhomogeneous injection of proppant into the fracture or a result of rock processing around the fracture.

There is a known proppant consisting of a mixture of bondable and removable particles (U.S. Pat. No. 6,114,410). The proppant developed contains bondable particles which adhere to other bondable particles and a portion of removable particles; application of this proppant improves the conductivity of a hydraulic fracture. Bondable and removable particles are introduced into the proppant. The bondable particles can be coated with curable resin. The bondable particles, when contacting similar bondable particles, form a stable self-supporting matrix, and the removable particles from the self-supporting matrix provide the ambient fracture conditions. This increases the conductivity of the fracture and improves the overall productivity of the hydraulic operation.

The disadvantage of the known technical solution is that it is not possible to clean out the space between the proppant pillars, which results in a reduction in the fluid flow between the pillars.

There is a known method of delivering the resin coated proppant in hydraulic fractures (U.S. Pat. No. 4,785,884). The said coating can be activated with an acid catalyst at relatively low temperatures (below 55° C.) to create a thermosetting coating on the proppant surface. This thermosetting coating provides a mutual adhesion of the proppant particles, this adhesion results in making proppant pillars in the fracture. The technical result obtained due to the implementation of this technical solution is a control sand flowback from the reservoir, but in this case the space between the pillars may become clogged and this reduces the fluid flow between the pillars.

The technical task to be solved by means of the technical solution developed is to increase the production of a well treated by the hydraulic fracturing method.

The technical result obtained from the implementation of the method developed consists in enhancement of the oil flow between the proppant pillars in a hydraulic fracture.

To achieve the above-mentioned technical result, it is suggested to apply a method of improving the fracture conductivity in the space between proppant pillars. According to this method, the free surface of the fracture or the volume of the fracture should be treated with a chemical agent, using a protecting mask formed by the substances that have precipitated from the above-mentioned pillars. The said chemical agent can be injected into the well either after the development of pillars from the proppant particles, or simultaneously with the injection of proppant particles. The chemical agent is injected in the form of solid particles capable of producing the live chemical agent under exposure to the well conditions. The resin substances of proppant pellets able to release from the pillars under the well conditions or resin substances binding the proppant particles together into pillars are used as the protecting mask forming substances.

Embodiments of the method developed can be as follows:
1. A solvent or a fluid carrying an oxidant/a gel destructor is additionally injected into the proppant packing created.
2. A chemically active fluid that attacks the rock and "opens" the rock surface between and around the proppant pillars is additionally injected.

But in both cases a resin coating is created on the particles of ordinary proppant and binds the proppant particles together under load to form a "mask" or a barrier on the fracture surface. The proppant material that is coated with the resin may be any traditional proppant materials (i.e. natural sand, ground nut hulls, man-made particulates, ceramics, bauxites, glass, etc).

There are known methods of making clusters/islands from proppant particles, or structures in the form of pillars over the entire volume of a hydraulic fracture. These pillars prevent the fracture from closing while enough open space is left for oil flow towards the borehole. The technical solution developed is aimed at expanding, etching or washing the areas between the pillars that have been produced from compressed particles of proppant or by etching the free surface after these structures have been created.

According to one of the embodiments of the method developed, a fracture wash/flush is carried out, using a batch of a solvent or of a fluid with a gel destructor or with an oxidant. This wash/flash helps to remove the remains of gel from the fracture or of a filter cake that usually develops as a result of basic hydraulic fracturing planned for precipitation of proppant in the form of pillars structures. This washing composition will work with a hydraulic fluid pumped for cracking the formation and delivering the proppant to the fracture. In another embodiment of the method developed, the washing fluid may react with various chemical and mechanical components (e.g. substances that help to remove the particles of soluble proppant, addition of a resin curing agent required for consolidation of proppant pillars) which are injected into the well. A solvent is injected at a pressure below the hydraulic fracturing pressure limit, so that this pressure should not disturb the existing structure of the proppant pillars. Other variants of flushing with other types of fluids may be required during further operations: fluids that change the rock wettability, for dissolving natural clays and sediments or for fixing other problems arising during hydrocarbon production.

According to the second embodiment of the method developed, it is suggested that a washing fluid which will itself react with the reservoir formation should be used. As usual, this fluid is injected at a pressure below the hydraulic fracturing pressure and the existing structure of the proppant pillars is not to be disturbed by this procedure. If the rock (carbonates or dolomites) reacts with an acid wash, the live acid being injected passes via the existing network of proppant pillars, by analogy with the method described above. This acid fluid will etch the area around the proppant pillars produced, while keeping the "room-and-pillar" structure unchanged.

For all above-mentioned embodiments, it is suggested that a resin material in a proppant pack should be used so that a "protective mask" could be created on the surface of the fracture and on the proppant pillars. Although application of resin coated proppant as a means of binding the proppant particles or as a means of increasing the stability of the pillars produced is known, but application of such proppants as a means of creating a mask to be used for selective etching the hydraulic fracture volume or free surface is still unknown. According to the method developed, "masks" or barriers develop on the fracture surface due to deformation of particles or due to release of the resin material out from these particles and protecting the areas against subsequent chemical reactions. Besides, if the resin coating can become deformed or solidify in due time, this can serve as a protection against the life acid produced by hydrolysis of solid acid precursor (e.g. a polymer of lactic acid or a polymer of polyglycolic acid—PLA or PGA) which are injected together with ordinary proppant. Other materials that may be suitable include but are not limited to lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, polymers of 3-hydroxypropionic acid, and mixtures thereof.

The technical solution developed will be further illustrated by examples of its embodiments.

1. Various materials (e.g., plastic or ceramic pellets) were placed between two cores of carbonate rock (Indiana Limestone). These materials sandwiched between the carbonate cores is a model of separate pillars made of a proppant material (with open channels between pillars). These pellets were compressed to the surface of the carbonate specimens without pellet material melting or penetration into the rock under these conditions. The pellets were placed irregularly, in small groups, occupying about 30% of the specimen area. Then, the resulting clearance was flushed with concentrated HCl (~35%) for a few minutes. After the acid flushing has been carried out, the space between the cores was washed with water. After the water wash, the specimens were separated for surface examination. All squeezed pellets can be easily separated from the limestone cores, and the material of the pellets neither left traces on the surface of the rock, nor melted inside, nor otherwise reacted with the limestone (i.e. the material introduced served only as an inert protecting mask). In the places where pellets of the polymer material were in direct contact with the surface of the specimens, the scale of acid etching was small or often non-existent. If the pellets were clustered with empty space in the middle of the cluster, the etching traces were insignificant in this internal area.

The results of the experiment have shown that an acid solution is able to further etch the areas between the proppant pillars. Even if the material originally used to create the pillars were to later degrade, dissolve, or otherwise disappear, the acid had effectively made pillars from the rock material itself at earlier stages—preserving the desired open geometry of the fracture.

2. A dense and inhomogeneous packing of a solid lactic acid polymer particles and rubber balls was sandwiched between two cores of a carbonate rock. The clamped cores were then submerged in a 2% solution of KCl, and a small amount of water was poured between the cores in order to get rid of air bubbles in the packing. After that, the cores with the compressed inhomogeneous packing were held tight for 4 hours at a temperature of 135° C. During this period, the pellets of the lactic acid polymer decomposed into lactic acid monomers (up to 90% of lactic acid precursor decomposes under these conditions). The cooled cores were then disassembled for surface inspection. The examiners could see areas where the rubber balls had consolidated and those areas were not etched. Exposed (open) areas had considerable acid etching.

3. Also, a similar experiment was carried out, using a steel nut and pellets of lactic acid polymer: the steel nut and pellets were fixed between two rock slabs. After hydrolysis of the lactic acid polymer, the internal surface of the slabs was examined. The area of direct contact of the surface with the nut remained unchanged while the rest of the surface was etched. The latter experiment emphasizes only the ability of solids materials to mask the surface. Actually, the material for protection of zones on the fracture surface is the soften material of resin coating on the proppant.

The invention claimed is:

1. A method of enhancing conductivity of a fracture including a pillar containing proppant and a substance, comprising
   injecting a chemical agent into the fracture at a pressure below a hydraulic fracturing pressure limit such that a space proximate to the pillar is treated with the chemical agent;
   flushing the fracture with a fluid that changes rock wettability, and/or that dissolves natural clay or sediment;
   wherein the substance is released from the pillar and forms a protecting mask on at least a portion of the space proximate to the pillar.

2. A method according to claim 1, wherein the chemical agent is injected into the fracture after the pillar has been formed.

3. A method according to claim 1, wherein the proppant and the chemical agent are injected into the fracture simultaneously, with the chemical agent being injected as solid particles capable of releasing the chemical agent.

4. A method according to claim 1, wherein the protecting mask is formed from resin coated particles.

5. A method according to claim 1, wherein the protecting mask is formed from resin substances binding the proppant particles into pillars.

6. A method of enhancing the conductivity of a fracture including pillars containing proppant and a substance, comprising:
   injecting a chemical agent into the fracture at a pressure below a hydraulic fracturing pressure limit such that an exposed surface of the fracture is treated with the chemical agent;
   flushing the fracture with a fluid that changes rock wettability, and/or that dissolves natural clay or sediment;
   wherein the substance is released from the pillars and forms a protecting mask on at least a portion of the exposed surface of the fracture.

7. A method according to claim 6, wherein the chemical agent is injected into the fracture after the pillars have been formed.

8. A method according to claim 6, wherein the proppant and the chemical agent are injected into the fracture simultaneously, with the chemical agent being injected as solid particles capable of releasing the chemical agent.

9. A method according to claim 6, wherein the protecting mask is formed from resin coated particles.

10. A method according to claim 6, wherein the protecting mask is formed from resin substances binding the proppant particles into pillars.

11. A method of treating a space contained in a subterranean formation including pillars containing proppant and a substance, comprising:
    injecting a chemical agent into the space at a pressure below a hydraulic fracturing pressure limit such that an exposed surface of the space proximate to the pillars is treated with the chemical agent;
    flushing the space with a fluid that modifies rock wettability, and/or that dissolves natural clay or sediment;
    wherein the substance is released from the pillars and forms a protecting mask on at least a portion of the exposed surface of the space.

12. A method according to claim 11, wherein the chemical agent is injected into the space after the pillars have been formed.

13. A method according to claim 11, wherein the proppant and the chemical agent are injected into the space simultaneously, with the chemical agent being injected as solid particles capable of releasing the chemical agent.

14. A method according to claim 11, wherein the protecting mask is formed from resin coated particles.

15. A method according to claim 11, wherein the protecting mask is formed from resin substances binding the proppant particles into pillars.

16. A method of treating a free surface of a fracture including pillars containing proppant and a substance, comprising:

injecting a chemical agent into the fracture at a pressure below a hydraulic fracturing pressure limit such that an exposed surface of the fracture is treated with the chemical agent;

flushing the fracture with a fluid that modifies rock wettability, and/or that dissolves natural clay or sediment;

wherein the substance is released from the pillars and forms, a protecting mask on the exposed surfaced of the fracture.

17. A method according to claim 16, wherein the chemical agent is injected into the fracture after the pillars have been formed.

18. A method according to claim 16, wherein the proppant and the chemical agent are injected into the fracture simultaneously, with the chemical agent being injected as solid particles capable of releasing the chemical agent.

19. A method according to claim 16, wherein the protecting mask is formed from resin coated particles.

20. A method according to claim 16, wherein the protecting mask is formed from resin substances binding the proppant particles into pillars.

* * * * *